Nov. 30, 1965 E. J. REGAN 3,221,293

ELECTRIC TERMINAL DEVICE

Filed March 28, 1963

INVENTOR.
EDMOND J. REGAN

BY Herbert W. Arnold

ATTORNEY

United States Patent Office 3,221,293 Patented Nov. 30, 1965

3,221,293
ELECTRIC TERMINAL DEVICE

Edmond J. Regan, Beverly, Mass., assignor to Raytheon Company, Lexington, Mass., a corporation of Delaware Filed Mar. 28, 1963, Ser. No. 268,691
12 Claims. (Cl. 339—253)

This invention pertains generally to electric terminal devices, and more particularly to electric terminal devices of the spring clip type adapted to receive and grip to leads or contacts on both pigtail and ferrule electrical components and the like.

The number of different configurations of electrical spring clip terminal devices is large, and the uses to which they are adapted are many. However, it has been characteristic of the prior art to provide terminals peculiarly adapted to receive a lead, plug, blade or the like of a particular chosen size and shape, rather than to afford flexibility by permitting the accommodation of leads of several different sizes and shapes. Also, the prior art has generally failed to provide terminal clips adapted to receive a plurality of leads or the like simultaneously. Furthermore, the spring clips in common use heretofore have not been adaptable to the simultaneous reception of a plurality of leads or the like of different sizes and shapes. For the most part, the spring clip terminals of the prior art are either not capable of the reception of more than one lead or ferrule at a time, or, alternatively, where they are of sufficient size to permit the insertion of more than one lead at a time, there are generally no means present to provide a positive and effective grip on the several leads so introduced. This problem is merely emphasized upon the simultaneous insertion of leads of more than one size or shape, since, for example, the placement of a lead of large width or diameter within a spring clip will result in a spreading of the jaws of the clip to such an extent that a small lead inserted therein is not positively gripped.

It is accordingly an object of the present invention to provide an electric terminal of the spring clip type which is adapted to receive component leads, ferrules and the like of more than one size or shape.

Another object of the invention is to provide an electric terminal of the spring clip type which is adapted to receive a plurality of component leads, ferrules and the like simultaneously.

Still another object of the invention is to provide an electric terminal of the spring clip type which is adapted to receive a plurality of component leads, ferrules and the like of differing sizes and shapes simultaneously.

In accordance with the present invention, the above and other objects are achieved by means of a spring clip terminal device having, in one preferred form, a pair of juxtaposed contact elements of resilient conductive material having a first pair of respective corresponding end portions fixed relative to each other, as well as a second pair of respective corresponding end portions folded back upon themselves between the two contact elements, and a retaining member which extends freely through both of the folded-back end portions near the free ends thereof and which engages both of the contact elements to retain the same against the divergent motion normally encountered in the devices of the prior art upon the insertion of a component lead or ferrule therebetween.

In an alternate preferred form of the terminal of this invention, there is also included a divider member which is interposed between the two contact elements in similar juxtaposed relationship, having one end connected to the terminal device, and having a free end between the pair of contact elements at the mouth of the terminal device, with the mouth being defined as that portion where the two spring clip elements are folded back upon themselves to form a means of ingress and egress for the component leads and the like which are to be introduced into the terminal device and held thereby.

With the above considerations and objects in mind, the invention itself will now be described in connection with alterate preferred embodiments thereof given by way of example, and not of limitation, and with reference to the accompanying drawings, in which.

Figure 1:
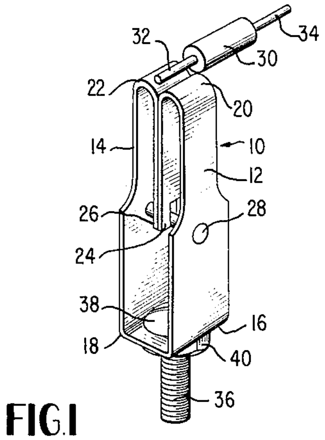
FIG. 1 is a perspective view of a preferred form of the electric terminal device of this invention.

Referring now particularly to FIG. 1, the spring clip electric terminal device of this invention is indicated generally at 10, comprising a pair of juxtaposed contact elements 12 and 14 of a suitable conductive material, such as beryllium copper or the like. The contact elements have a pair of relatively fixed first end portions 16 and 18, respectively, which together form the base of the terminal device. A pair of second respective end portions are indicated at 20 and 22, respectively, with each of these end portions being folded back on itself and inwardly of the terminal device, so that the free ends of the folded-back segments 24 and 26, respectively, lie between the two contact elements 12 and 14. In short, the device as described thus far includes a pair of juxtaposed contact elements 12 and 14 having first respective corresponding end portions 16 and 18 which are fixed relative to each other by virtue of their integral connection through the base of the device, and second respective corresponding end portions 20 and 22 which are folded back upon themselves to form folded-back segments 24 and 26, respectively, lying between the contact elements 12 and 14.

FIG. 1 also shows a retaining member 28, which is in the form of a rod or the like, and which extends from contact element 12 through both of the folded-back segments 24 and 26 and to the contact element 14, as will be better understood in the description that follows in connection with subsequent figures of the drawings. It is sufficient to state at this point that the retaining member 28 engages both of the contact elements 12 and 14, while it extends freely through the two folded-back segments 24 and 26, thus permitting free movement of the latter two members within the limits defined by the former, and providing a positive stop or retainer against the outward or divergent movement of the two contact elements that would normally occur upon the insertion of a component lead, ferrule or the like between the jaws of the terminal device.

Merely for the purposes of this explanation of the terminal device of this invention, an exemplary electrical or electronic component 30 is shown, having leads 32 and 34 extending therefrom. Lead 32 is shown adjacent the mouth of the terminal device of this invention, and in substantial alignment with the position it would assume upon being inserted into the terminal between the contact elements 12 and 14. It will be understood by those skilled in the art that the component 30 may be of any suitable form or type, such as a condenser, a resistor, a transistor or the like, and further that the lead or connector 32 need not necessarily be a part of or even connected to an electrical component, since this lead may be the end of an ordinary conductor forming a part of a transmission line or other connecting means. It will also be understood that lead 32 need not necessarily be round in cross-section as shown in FIG. 1, but may be of other shape and size, as will be further explained in the description that follows in connection with later figures of the drawings.

Figure 2:
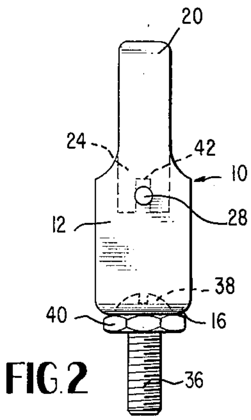
FIG. 2 is a front elevation view of the electric terminal device shown in FIG. 1.

FIG. 2 shows the front elevation configuration of the terminal device of FIG. 1, with like reference numerals being employed to indicate the same elements in the two figures, as well as in those that follow. As may be more clearly seen in FIG. 2, the lower or relatively fixed end portion 16 of the contact element 12, which together with the corresponding end portion of the contact element 14 forms the base of the terminal device, has associated therewith a suitable mounting means, such as the threaded connector 36. One exemplary form of this mounting means is shown as the bolt or other threaded connector 36 having a head 38 and a threaded shank extending through an aperture (not shown) in the base of the terminal device. The connector 36 may be held in place by means of a nut 40 or the like.

Figure 3:
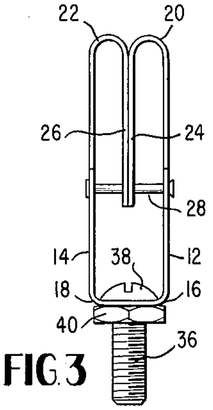
FIG. 3 is a side elevation of the device shown in FIG. 2.

The free end of the folded-back segment 24 is slotted, as at 42, to permit the retainer member 28 to extend freely therethrough, and it will be understood that a similar slot or the like is provided in the free end of the folded-back segment 26, for the same purpose. Retaining member 28 may be securely connected at its respective ends to the two contact elements 12 and 14, or alternatively the ends of retaining member 28 may be swaged or otherwise formed into heads or the like so as to form a captive retaining member which is free to move with respect to the contact elements 12 and 14 but which positively retains the same against divergent movement beyond the limits defined by the distance between the two heads on the retaining member. These heads or other enlarged portions of the retaining member 28 may more clearly be seen in FIG. 3, which shows the other aforementioned parts of the terminal device in side elevation. It will be appreciated by those skilled in the art that the structure described thus far is peculiarly adapted to meet the objects of this invention as stated above. For example, it is clear that the end portions 20 and 22 of the contact elements 12 and 14 are free to be slightly flexed outwardly about a pivot point defined by the point at which the retaining member 28 engages each of the contact elements, thereby facilitating the ingrees of a component lead or the like therebetween. Further, it is equally apparent that the folded-back segments 24 and 26 are free to be flexed outwardly about pivot points approximately determined by the points at which the end portions 20 and 22 are folded back upon themselves.

Figure 4:
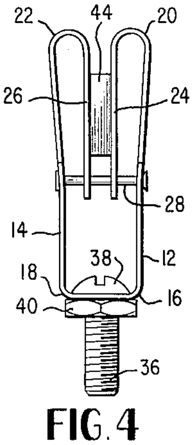
FIG. 4 is a view similar to that of FIG. 3, but showing a component lead or the like of one form inserted therein.
Figure 5:
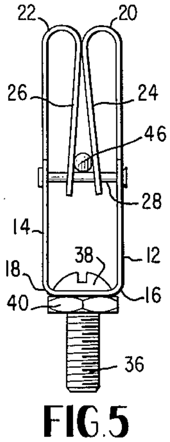
FIG. 5 is a view similar to that of FIG. 3, but showing a component lead of the like of a second form inserted therein.
Figure 6:
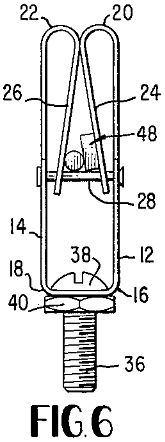
FIG. 6 is a view similar to that of FIG. 3, but showing a plurality of component leads or the like of various sizes and shapes inserted therein.

The operation or use of the electrical terminal device of the invention described thus far is illustrated in FIGS. 4, 5 and 6. FIG. 4 shows the terminal device employed in connection with a lead 44 or the like of generally rectangular cross-section and of fairly large size relative to the terminal device shown. A particular advantage is realized in this instance, since as may be seen in FIG. 4 the two folded-back contact segments 24 and 26 are able to assume a parallel position by self-alignment with the contiguous sides of the lead or bus 44, thus providing a maximum of contact area with the lead and thereby affording a greatly enhanced current-handling capability. FIG. 5 shows the relative position of several elements of the terminal device upon the insertion of a relatively small lead 46 or the like of circular cross-section. It will be seen that in either case the lead is positively gripped between the folded-back segments 24 and 26, and where the lead so inserted is of relatively small cross-sectional area, it will further be noted that the jaws of the terminal, i.e., the end portions 20 and 22, close toward each other to increase the effectiveness of the friction grip and to more positively prohibit the escape of the inserted lead. It will be understood, of course, that the normal path of entry and removal for the leads held in the terminal device of this invention is that path extending from the mouth of the device down along the two folded-back segments to the stop-point determined by the cross-bar forming the retaining member 28. It is now seen that member 28 serves not only to retain the two contact elements against divergent movement, but also serves as a positive stop member for leads and the like as they are inserted between the contact elements 12 and 14 and moved down along the length of the folded-back segments 24 and 26, thereby preventing such leads, ferrules and the like from slipping down past the ends of the folded-back segments and thus being lost to the grip of the terminal device.

Of particular importance as a feature of the present invention is the fact that a plurality of leads of differing sizes and shapes may simultaneously be inserted between the jaws of the terminal device, much in the manner of the insertion of a single lead, and with equal facility. This feature is illustrated in FIG. 6, wherein a plurality of leads, indicated generally at 48, of differing size and shape, are shown firmly held in the resilient grip of the terminal device. Here, again, the fact that the mouth of the device tends to close on the leads inserted therein aids in the positive retention of the several leads in a secure grip.

Figure 7:
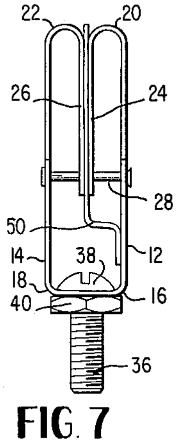
FIG. 7 is a side elevation view of a second or alternate preferred form of the electrical terminal device of the invention.

A second preferred form of the terminal device of the invention is shown in FIG. 7, wherein like reference numerals are employed to indicate the same elements shown in the previous figures. It will be seen that the terminal device of FIG. 7 is substantially identical to that shown in FIGS. 1 through 6 except for the introduction of the divider member 50 in the structure shown in FIG. 7. This divider member will normally be of a suitable conducting material, such as beryllium copper, but need not necessarily be so, since it for the most part acts as a stop or the like against which one or more leads on either side thereof are urged by the resilient tension in the two folded-back segments 24 and 26, thereby providing what amounts to a dual spring clip, with each of the dual portions being characterized by the structural features of the device shown in FIGS. 1 through 6, as well as offering the advantages thereof, and in dual form.

As to the structure of the form of the device shown in FIG. 7, the significant change, as stated above, is the addition of the divider member 50. This member is connected to the terminal device at some relatively stable or stationary point, as by being welded or otherwise attached to one of the contact elements 12 (or 14) intermediate its length, and preferably between the base end thereof and the point at which the retaining member 28 engages the contact element. The opposite end of the divider member is relatively free, extending out of the mouth of the terminal device between the end portions 20 and 22 of the two contact elements. Accordingly, the divider member 50 lies between the two folded-back segments 24 and 26 in normally contiguous, juxtaposed relationship, as shown in FIG. 7. The retaining member may extend freely through the divider member 50, so as to permit slight lateral movement of the latter, or it may be fixedly connected to the divider member, as desired.

Figure 8:
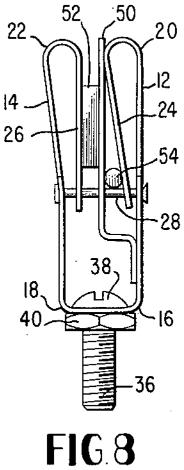
FIG. 8 is a view similar to that of FIG. 7, but showing a pair of component leads or the like of differing sizes and shapes inserted therein.

The operation or manner of utilization of the terminal device of FIG. 7 is quite analogous to that of the structure in FIG. 3, and FIGS. 8 through 10 are illustrative of such use. In FIG. 8, a lead 52 or or the like of substantially rectangular cross-section is shown firmly held in a grip between the divider member 50 and the folded-back segment 26 of the contact element 14. Similarly, a smaller round lead 54 is clasped between divider member 50 and the folded-back segment 24 of contact element 12. As before, the retaining member 28 serves also to provide a positive bottom or stop for the portion of the terminal device in which the leads are held.

Figure 9:
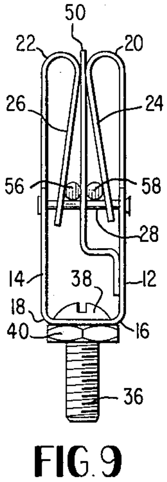
FIG. 9 is a view similar to that of FIG. 7, but showing a pair of component leads or the like of the same size and shape inserted therein.
Figure 10:
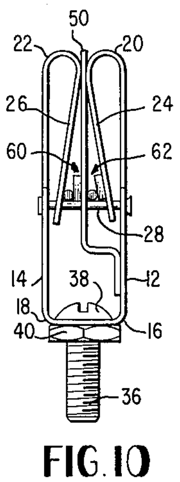
FIG. 10 is a view similar to that of FIG. 7, but showing a large plurality of component leads or the like of differing sizes and shapes inserted therein.

In FIG. 9, a pair of relatively small leads 56, 58 are securely held, irrespective of their tiny dimensions, as shown. Here again, it is to be noted that the mouth of the terminal device is substantially closed, so as to further the effect of the positive grip. Much the same may be said for the situation illustrated in FIG. 10, wherein a plurality of leads, indicated generally at 60 and 62, are securely held in spite of their variation in shape and size.

The invention has been described above in some detail, and particularly with reference to its application to the art of component lead clips. However, and as stated above, it will be apparent to those skilled in the art that the invention is also applicable to other arts wherein it is desired to provide a spring clip or the like of wide versatility in the size and shape, simultaneous number and combinations thereof of articles, whether electrically conductive or not, which are to be held therein. Hence, the invention is not to be considered as limited to the particular details given, nor to the specific application to which reference has been made during the description of the device, except insofar as may be required by the scope of the appended claims.

What is claimed is:

1. An electric terminal device, comprising:

a pair of juxtaposed contact elements of resilient conductive material having first respective corresponding end portions fixed relative to each other, and second respective corresponding end portions folded back upon themselves between said contact elements, a retaining member extending freely through both said folded-back end portions near the free ends thereof and engaging both of said contact elements substantially to retain said contact elements against divergent motion irrespective of displacement of said folded-back end portions resulting from an insertion of a contact member therebetween, and a divider member interposed between said pair of juxtaposed contact members, said retaining member also extending through said divider member.

2. An electric terminal device in accordance with claim 1, wherein said divider member is of electrically conductive material and constitutes a third contact element.

3. An electric terminal device in accordance with claim 1, wherein said divider member lies in juxtaposed relationship with said pair of contact elements, being mounted on said electric terminal device and having a free end at the mouth thereof as defined by the points at which said second respective corresponding end portions are folded back upon themselves.

4. An electric terminal device in accordance with claim 3, wherein said pair of juxtaposed contact elements constitute the leg portions of a substantially U-shaped integral contact member.

5. An electric terminal device in accordance with claim 3, and including means for mounting said first respective corresponding end portions on a common support.

6. An electric terminal device in accordance with claim 3, wherein the folded-back segments of said second respective corresponding end portions are normally contiguous with respective opposite sides of said divider member.

7. An electric terminal device in accordance with claim 3, wherein the folded-back segments of said second respective corresponding end portions are normally contiguous substantially throughout their length with respective opposite sides of said divider member in the absence of a contact member or the like therebetween.

8. An electric terminal device in accordance with claim 3, wherein said retaining member extends freely through both of the folded-back segments of said second respective corresponding end portions but is fixedly attached to both of said contact elements intermediate the respective ends thereof.

9. An electric terminal device in accordance with claim 3, wherein said retaining member extends through respective slots in the free ends of the folded-back segments of said second respective corresponding end portions.

10. An electric terminal device, comprising:

a pair of juxtaposed contact elements of resilient conductive material having first respective corresponding end portions fixed relative to each other, and second respective corresponding end portions folded back upon themselves between said contact elements, a retaining member extending freely through both said folded-back end portions near the free ends thereof and engaging both of said contact elements substantially to retain said contact elements against divergent motion irrespective of displacement of said folded-back end portions resulting from an insertion of a contact member therebetween, and a divider member interposed between said pair of juxtaposed contact members, said divider member being a strip of conductive material secured to an end portion of one of the contact elements and bent to extend between said folded-back end portions.

11. An electric terminal device in accordance with claim 10, further including means for mounting said first respective corresponding end portions on a common support.

12. An electric terminal device in accordance with claim 11 wherein said divider member is secured to one of the contact elements adjacent the end thereof mounted on said common support.

References Cited by the Examiner

UNITED STATES PATENTS

| | | | |
|---|---|---|---|
| 1,623,955 | 4/1927 | Ansingh | 339—262 |
| 1,665,446 | 4/1928 | Conrad | 339—258 X |
| 2,092,044 | 9/1937 | La Bar | 339—263 |
| 2,318,861 | 5/1943 | Huguelet | 339—262 X |
| 2,983,892 | 5/1961 | Williams et al. | 339—18 |
| 3,060,402 | 10/1962 | Olsson et al. | 339—242 |
| 3,116,101 | 12/1963 | Kikta | 339—258 |
| 3,131,984 | 5/1964 | Kobryner | 339—258 |

FOREIGN PATENTS

| | | |
|---|---|---|
| 46,313 | 4/1929 | Norway. |

References Cited by the Applicant

UNITED STATES PATENTS

| | | |
|---|---|---|
| 1,799,747 | 4/1931 | Harvey. |
| 2,105,884 | 1/1938 | Hanser et al. |
| 2,243,741 | 5/1941 | Rowe. |
| 2,408,843 | 10/1946 | Gauthier. |
| 2,459,832 | 1/1949 | McKinley. |
| 2,665,415 | 1/1954 | Kojix. |

JOSEPH D. SEERS, *Primary Examiner.*